UNITED STATES PATENT OFFICE.

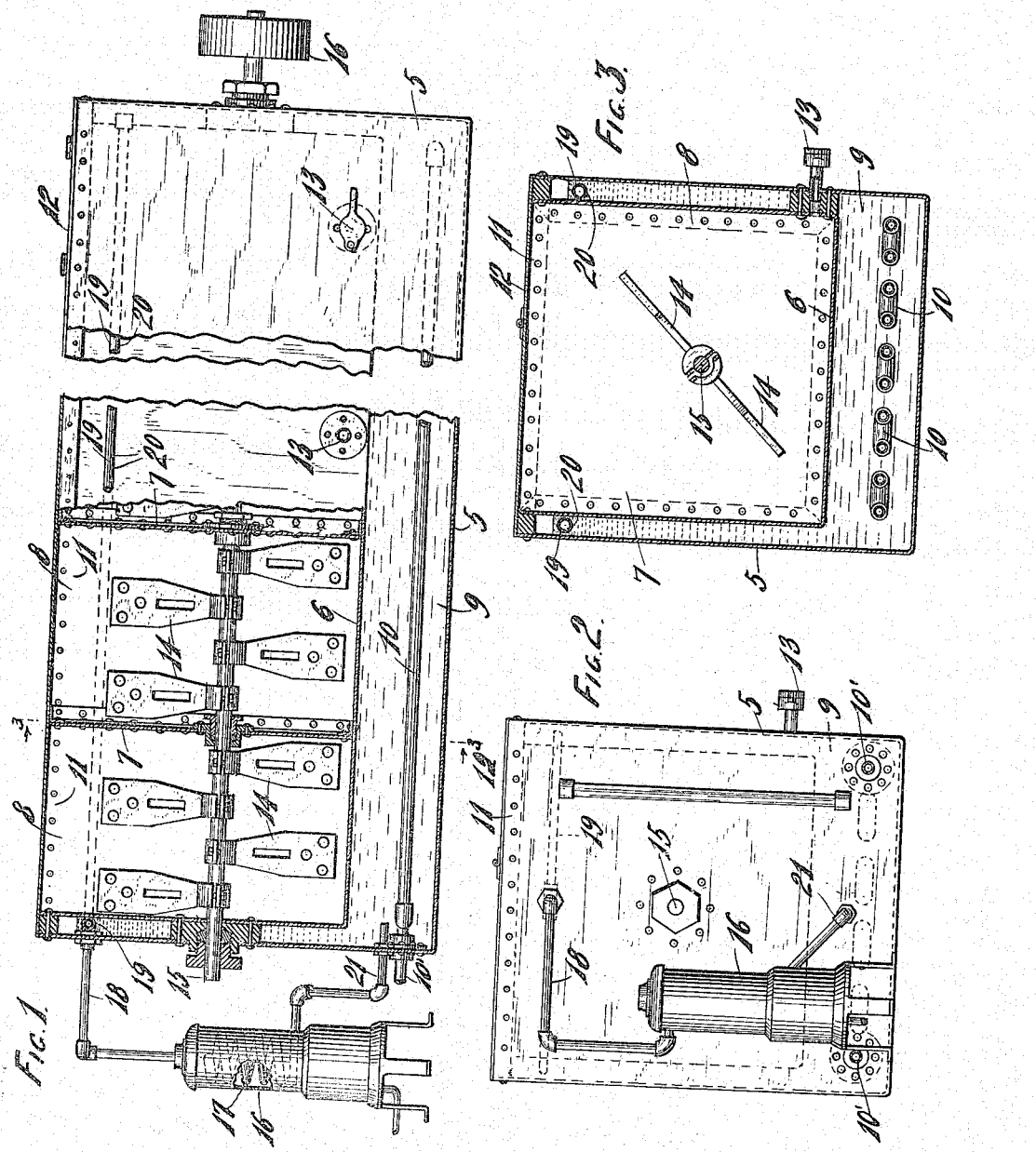

FRANK P. ZIEGLER, OF MILWAUKEE, WISCONSIN, ASSIGNOR TO GEORGE ZIEGLER CO., OF MILWAUKEE, WISCONSIN, A CORPORATION OF WISCONSIN.

CHOCOLATE-HEATER.

1,129,266.  Specification of Letters Patent.  Patented Feb. 23, 1915.

Application filed December 12, 1913. Serial No. 806,179.

*To all whom it may concern:*

Be it known that I, FRANK P. ZIEGLER, a citizen of the United States, and resident of Milwaukee, in the county of Milwaukee and State of Wisconsin, have invented new and useful Improvements in Chocolate-Heaters, of which the following is a description, reference being had to the accompanying drawings, which are a part of this specification.

This invention relates to improvements in chocolate heaters.

In the manufacture of chocolate candy for the trade it is customary to keep the chocolate in large receptacles or tanks in a fluid state and to draw out amounts to be used from time to time as desired. The receptacles or tanks are usually warmed by steam pipes in order to preserve the liquid condition of the chocolate and to prevent the material from becoming hard. In order to accomplish this result in the ordinary manner it is necessary to employ men to keep boilers going over night, Sundays and holidays to provide the necessary steam to insure finding the chocolate in a fluid state on the next work day. This arrangement has been found very expensive and unsatisfactory in many respects.

It is one of the objects of the present invention to overcome the before mentioned objectionable features and provide a chocolate heater which may be kept heated to the desired extent without requiring personal attention for a considerable period of time.

A further object of the invention is to provide a chocolate heater which while normally heated in the usual manner is provided with an auxiliary heater particularly adapted for use during closing periods of the manufacturing plant.

A further object of the invention is to provide a chocolate heater having means whereby all portions of the chocolate tank or receptacle may be kept practically at the same temperature to uniformly heat the chocolate contained therein.

A further object of the invention is to provide a chocolate heater in which the chocolate contained therein is properly stirred and mixed to form a smooth working material.

A further object of the invention is to provide a chocolate heater which is of simple construction, is easily operated and is well adapted for the purpose described.

With the above and other objects in view the invention consists of the improved chocolate heater and its parts and combinations as set forth in the claims, and all equivalents thereof.

In the accompanying drawing in which the same reference characters indicate the same parts in all of the views: Figure 1 is a side view of the improved chocolate heater, portions being in section to show interior construction; Fig. 2 is an end view thereof; and Fig. 3 is a transverse sectional view thereof taken on line 3—3 of Fig. 1.

Referring to the drawing the numeral 5 indicates the outer tank or water casing, 6 the inner tank or chocolate receptacle and 7 the partitions of the inner receptacle which divide the said receptacle into a plurality of compartments 8 for holding different grades of chocolate. The tanks are preferably formed of metal and the inner tank is of less size than the outer and is supported in spaced relation therein to form a water chamber or compartment 9 which extends around both sides and ends and the bottom portion of the chocolate tank or receptacle 6. Lengths of steam pipes 10 are positioned within the lower portion of the water compartment 9 to heat the water in said compartment for ordinary working day use and the outer inlet and outlet ends 10′ of these pipes extend to a suitable steam or hot water boiler (not shown).

The upper openings 11 of the chocolate compartments are covered by hinged tops or covers 12 to provide for filling and cleaning the compartments and valved discharge pipes 13 are provided for removing the liquid chocolate from the compartments. The valved discharge pipes extend from the chocolate compartments through the water compartment and through the wall of the outer tank so that the chocolate may be conveniently discharged into pails or other receptacles as required.

In order to keep all portions of the chocolate within the compartment at an even temperature and to prevent lumpy formation in the fluid mass, stirring blades or paddles 14 are provided for each chocolate compartment and these blades or paddles are mounted in pairs on a shaft 15 which extends horizontally through the chocolate compartments and out through the end walls of the outer tank. The shaft is provided with a belt wheel 16 on one of its outer ends which is adapted to be rotated by means of a belted connection (not shown) with a source of power.

The construction thus far described is particularly adapted for work day use but in keeping the chocolate in workable liquid form over night, Sundays and other periods of rest, the construction which will now be described is used. A gas or other heater 16 positioned adjacent to the outer tank 5 is provided with a heating coil 17 and the upper outlet end of this coil is connected to a tube 18 which extends through the outer casing or tank 9. The inner end of the tube 18 is connected to a perforated tube 19 which is positioned in the upper portion of the water compartment and extends around both sides and one end of the inner or chocolate tank 6. The perforations 20 of the tube 19 are provided in the bottom portion of the said tube and extend along the entire length of said tube so that warm water discharged therefrom will be evenly discharged all around the inner tank. An inlet pipe 21 connected to the lower end of the heating coil and to the lower portion of the outer tank and in communication with the water compartment provides for a constant circulation of the water through the coil of the heater when the heater is in operation and thus keep the chocolate in proper form over intervals of time.

From the foregoing description it will be seen that the chocolate heater is adapted to properly heat the chocolate during working days and to keep the chocolate in working condition during periods of rest with the minimum amount of labor and expense and is of great importance to the manufacturer, especially on Monday morning or after any shut-down of the factory to have his chocolate in workable condition and thereby avoid expensive delays.

What I claim as my invention is:

1. A chocolate heater comprising a heating chamber, a receptacle for containing chocolate in liquid form disposed within said chamber, means for heating the chamber under normal conditions by applying heat to a medium within it, and means for heating said chamber under other conditions by circulating said medium and applying heat to it outside of the chamber.

2. A chocolate heater comprising a water containing heating chamber, a receptacle for containing chocolate in liquid form disposed within said chamber, means for heating the water in said chamber under normal conditions comprising a heating medium within it, and means for heating said water under other conditions comprising means for circulating said water and applying heat thereto by a heating medium outside the chamber.

3. A chocolate heater, comprising an inner and an outer tank connected together to form a water containing heating chamber therebetween, means for heating the water in said chamber under normal conditions and without removing the water from the chamber, and auxiliary heating means for withdrawing and heating the water outside of the chamber and returning the heated water to the chamber under other conditions.

4. A chocolate heater, comprising an inner and an outer tank connected to form a water containing heating chamber therebetween, pipes extending into the chamber for conveying a heating medium therethrough under normal conditions, and other pipes communicating with said chamber for circulating the water out of said chamber to a heating medium and for returning the heated water to the chamber.

5. A chocolate heater, comprising an inner and an outer tank connected to form a water containing heating chamber therebetween, heating pipes extending into the chamber for heating the water in the chamber, a heating means located outside of the chamber, and pipes connecting the heating means to the chamber for circulating the water in the chamber through the heating means and returning it to the chamber.

6. A chocolate heater, comprising an inner and an outer tank connected to form a water containing heating chamber extending around the inner tank, a heating medium coil positioned within the chamber for heating the water under normal conditions, a heating means located outside of the chamber, a piped connection between said heating means and the lower portion of the chamber, a perforated pipe positioned within the upper portion of the chamber and having a piped connection with the heating means, and stirring means located within the inner tank.

7. A chocolate heater, comprising an inner and an outer tank connected to form a water containing heating chamber extending around the inner tank, a heating medium coil positioned within the chamber for heating the water under normal conditions, a heating means located outside of the chamber, a piped connection between said heating means and the lower portion of the chamber, a perforated pipe positioned within the upper portion of the chamber and having a piped connection with the heating means, a shaft extending horizontally through the two tanks, and stirring blades mounted on the shaft and positioned within the inner tank.

8. A chocolate heater, comprising an inner and an outer tank connected together to form a water containing heating chamber extending around the inner tank, partitions dividing the inner tank into a plurality of chocolate compartments, a shaft extending horizontally through said compartments and through the outer tank and having a driving means mounted thereon, stirring blades mounted on said shaft and located within the compartments, a heating medium coil positioned within the lower portion of the water chamber for heating the water, an auxiliary heating coil located outside of the water chamber and having a piped connection with the lower portion of the water chamber, a perforated pipe extending around the inner tank and positioned within the upper portion of the chamber, and a piped connection between the perforated pipe and the upper end of the heating coil located outside of the water chamber.

In testimony whereof, I affix my signature, in presence of two witnesses.

FRANK P. ZIEGLER.

Witnesses:
C. H. KEENEY,
EMILY SCHOWALTER.

Copies of this patent may be obtained for five cents each, by addressing the "Commissioner of Patents, Washington, D. C."